June 16, 1959     M. ALIMANESTIANO     2,890,802
AUTOMOBILE PARKING APPARATUS
Filed July 2, 1956     8 Sheets-Sheet 1

Mihai Alimanestiano
INVENTOR.

BY Murray Robinson
ATTORNEY

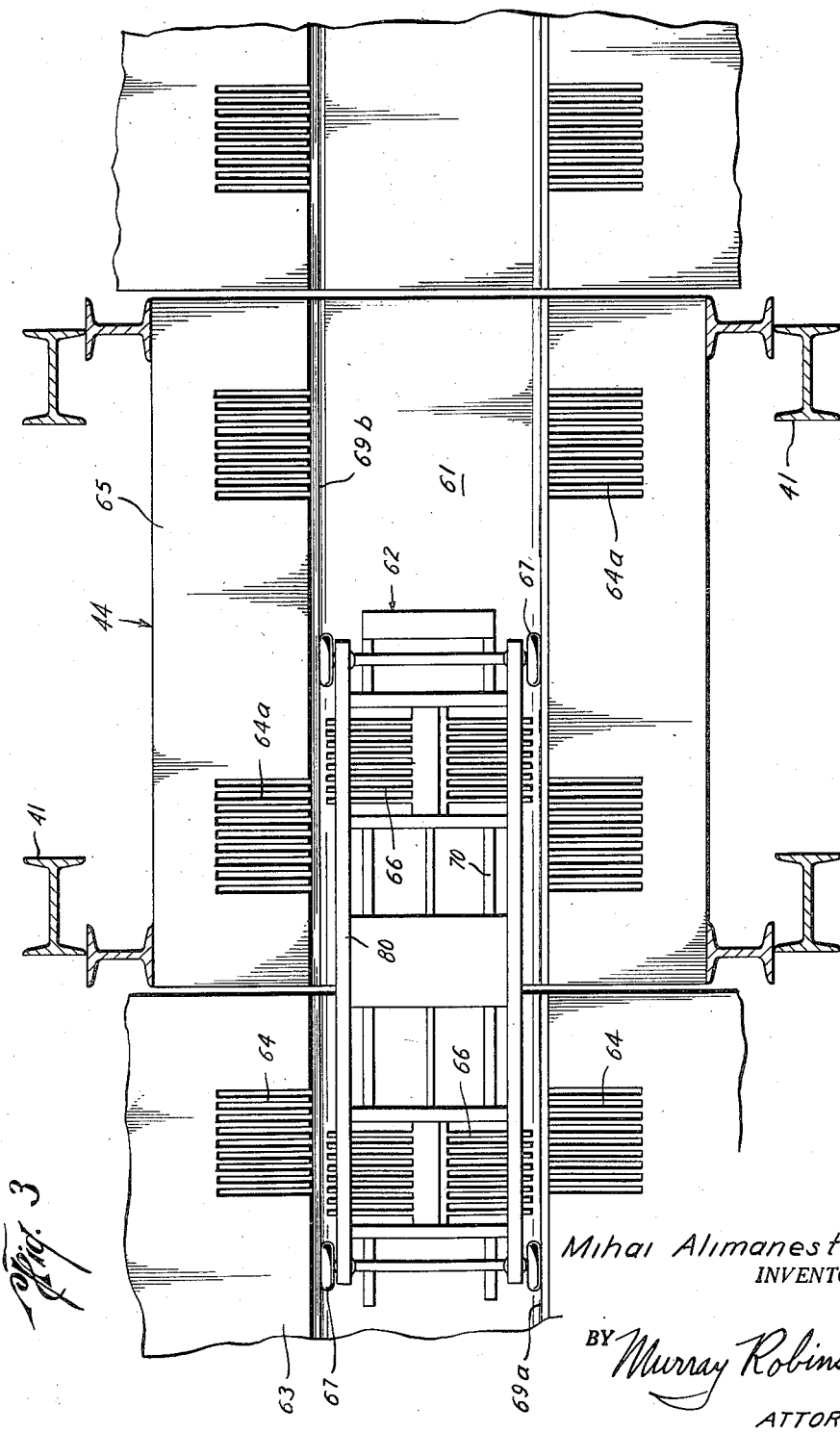

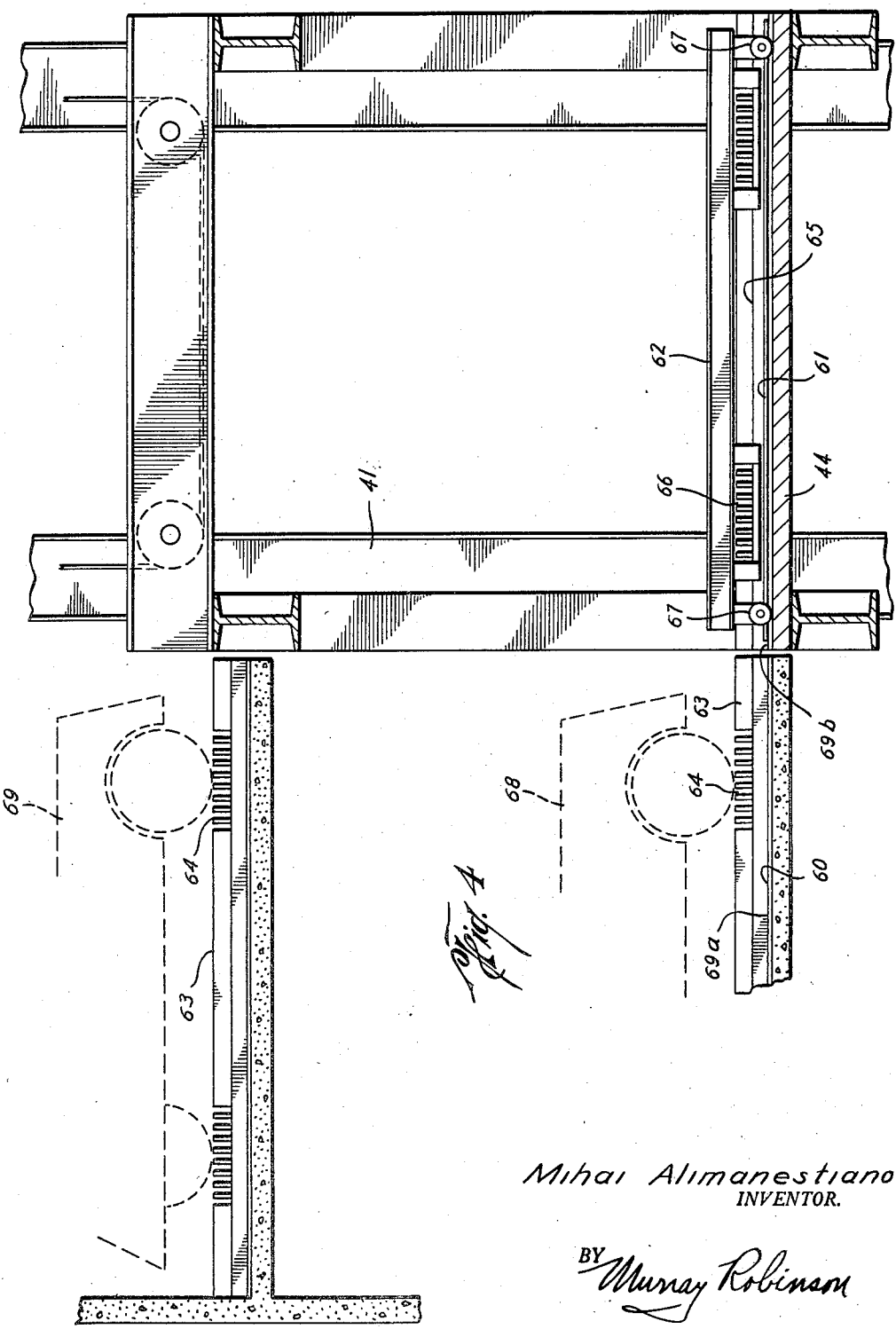

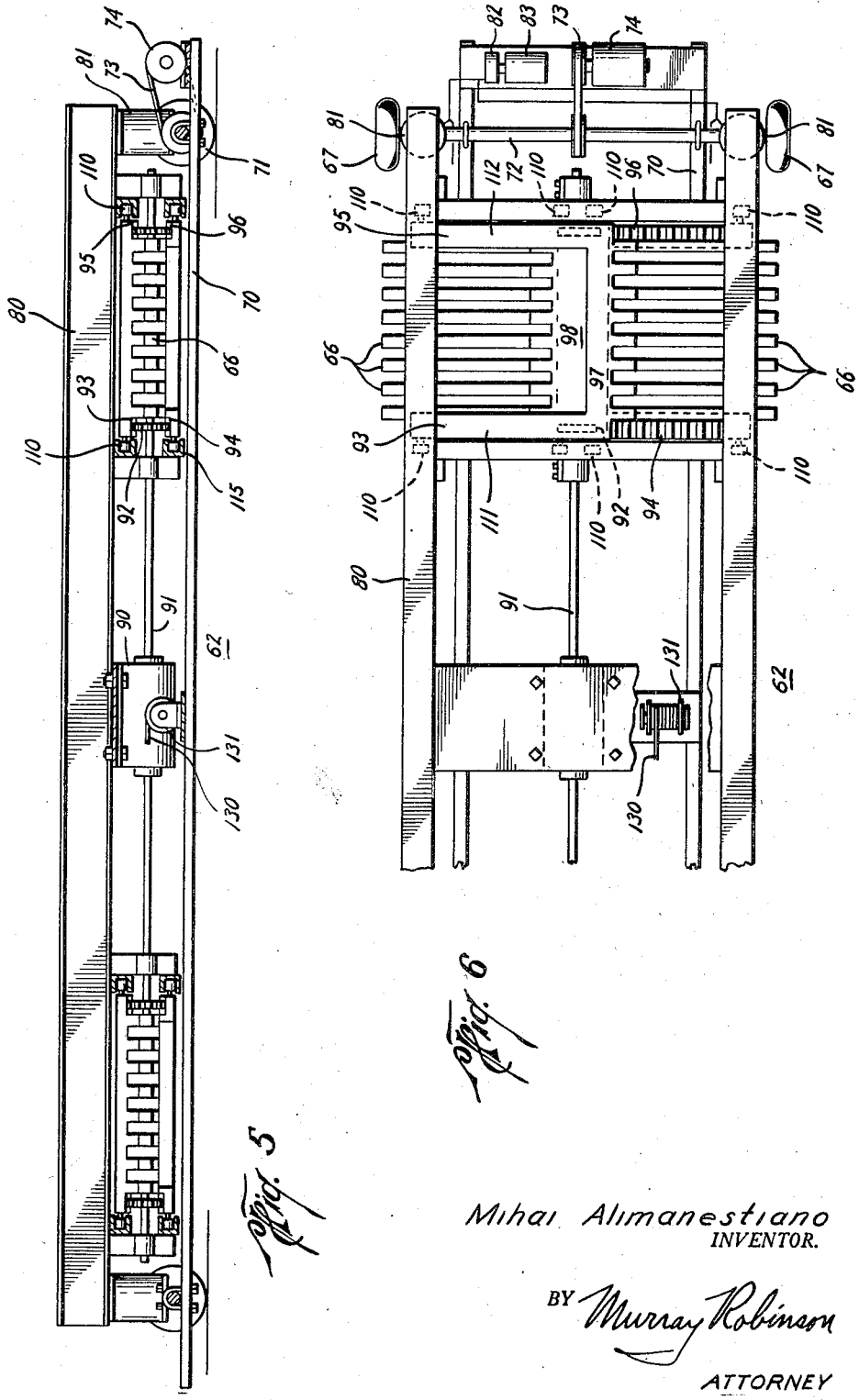

Mihai Alimanestiano
INVENTOR.

BY Murray Robinson
ATTORNEY

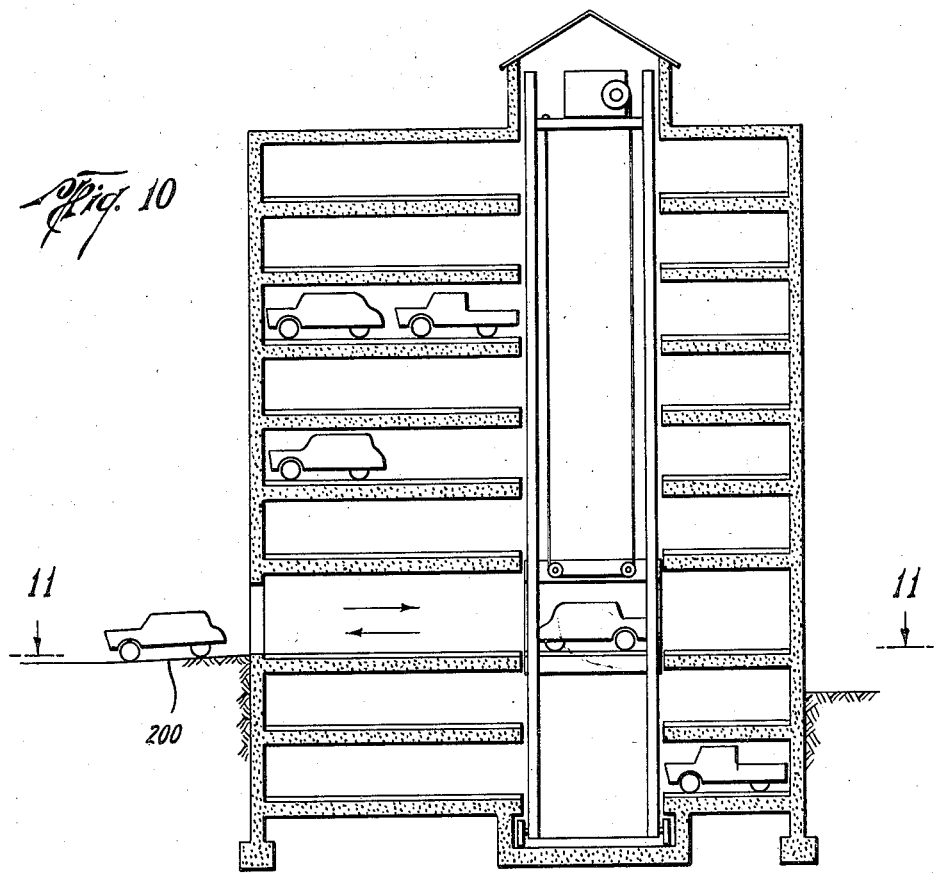
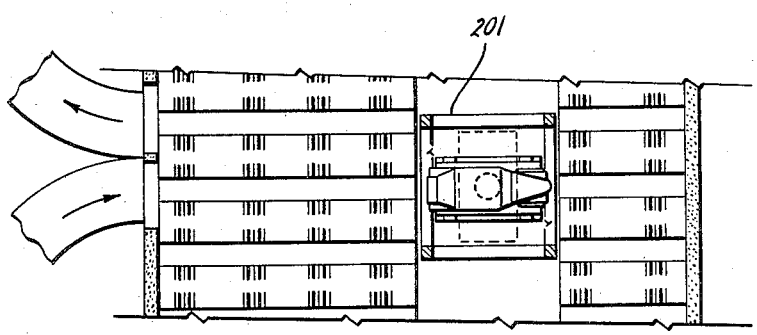

June 16, 1959   M. ALIMANESTIANO   2,890,802
AUTOMOBILE PARKING APPARATUS
Filed July 2, 1956   8 Sheets-Sheet 7

Mihai Alimanestiano
INVENTOR.

BY Murray Robinson
ATTORNEY

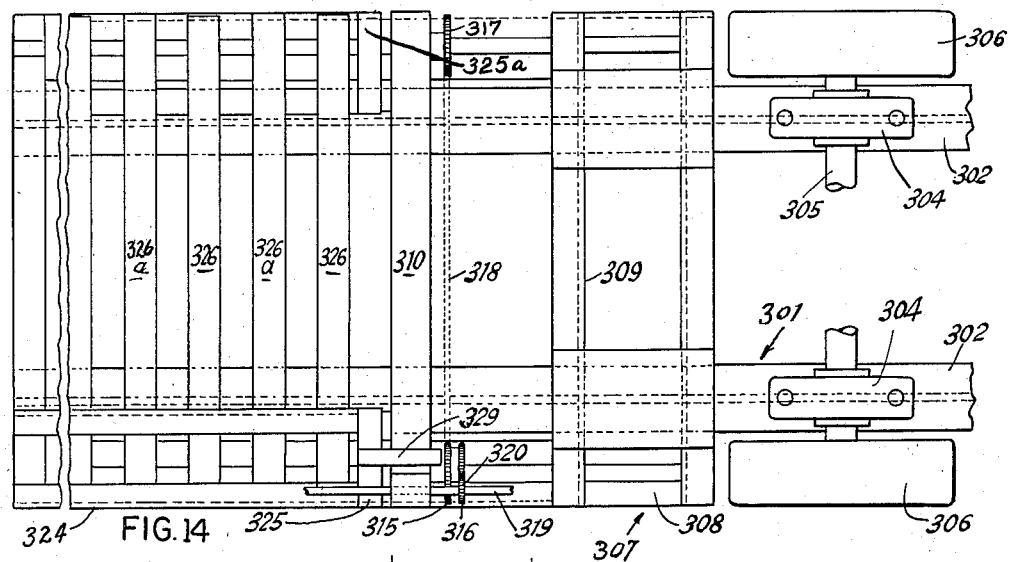
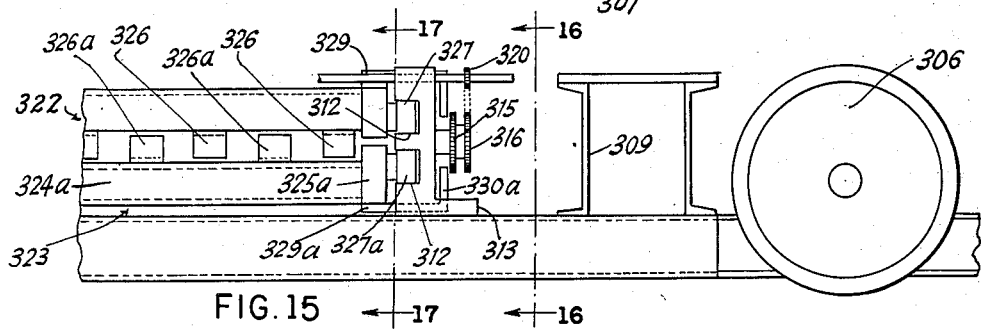
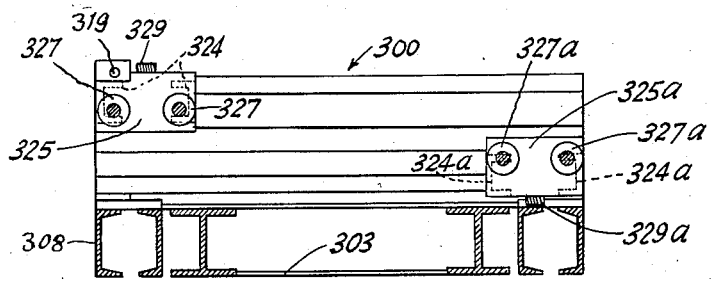
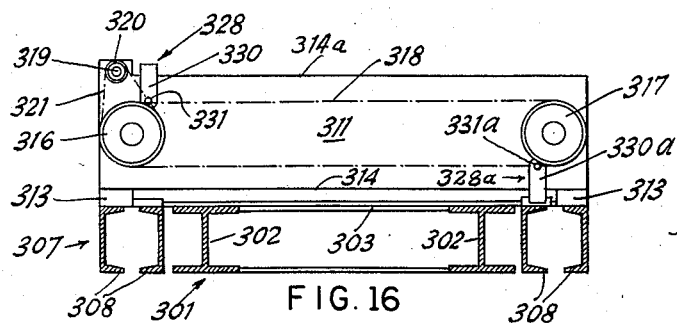

United States Patent Office 2,890,802
Patented June 16, 1959

2,890,802

AUTOMOBILE PARKING APPARATUS

Mihai Alimanestiano, New York, N.Y., assignor to Speed-Park, Inc., a corporation of New York Application July 2, 1956, Serial No. 595,314

14 Claims. (Cl. 214—16.1)

This invention pertains to conveyors and storage and more particularly to automatic parking garages for vehicles.

According to the invention, the garage comprises one or more blocks of parking stalls, each block comprising a plurality of superimposed tiers of horizontal rows of stalls, preferably with the rows being straight and with the stalls in each row vertically aligned with those below to form towers or vertical columns of stalls. Adjacent each stall block is a horizontally movable tower carrying a vertically movable elevator. A conveyor is provided for transferring vehicles between the elevator and the several stalls. Preferably, a conveyor is used which can operate on two opposite sides of the elevator so that the stall blocks can be arranged in pairs with one elevator tower moving in an alley between each pair and serving both stall blocks of the pair.

Further, in accordance with the invention, the individual stalls, elevator and conveyor are arranged with their lengths transverse to the lengths of the stall blocks and the path of travel of the elevator tower. With this disposition of parts, a vehicle can be driven into any street level stall block, that is any stall block which is at street level or which is connected to street level by a suitable ramp, and then the elevator is brought opposite the stall where the vehicle has been left and the conveyor moves the vehicle longitudinally onto the elevator. To complete the transfer and storage of the vehicle, the elevator moves horizontally and/or vertically to a position opposite a desired parking stall where the conveyor again moves the vehicle longitudinally into the parking stall. The reverse procedure is used to transfer the vehicle from the parking stall to a street level stall from which the vehicle can be driven away by its owner or operator.

If a pair of stall blocks is disposed so that both blocks have access to street level, a vehicle can be driven into a street level stall in one block and driven out from a street level stall in the other block without turning around. However, if only one block of the pair has access to street level, a turntable is provided on the elevator so that a vehicle can be turned around and can leave the garage in a forward direction from the same block that it entered.

It is the object of the invention to provide apparatus of the type described, which will be inexpensive and simple to construct, operate and maintain, and which will be safe and reliable in operation, and which will be rugged and durable.

Other objects will in part be obvious and in part hereinafter described.

In the drawings,

Fig. 3 is a horizontal section similar to Fig. 2 but to an enlarged scale showing more detail;

Fig. 4 is a vertical section similar to Fig. 1 but to an enlarged scale showing more detail;

Fig. 5 is a side view to a still larger scale of a portion of the apparatus and illustrating the conveyor shown in Fig. 4;

Fig. 6 is a plan view of said conveyor;

Figure 7:
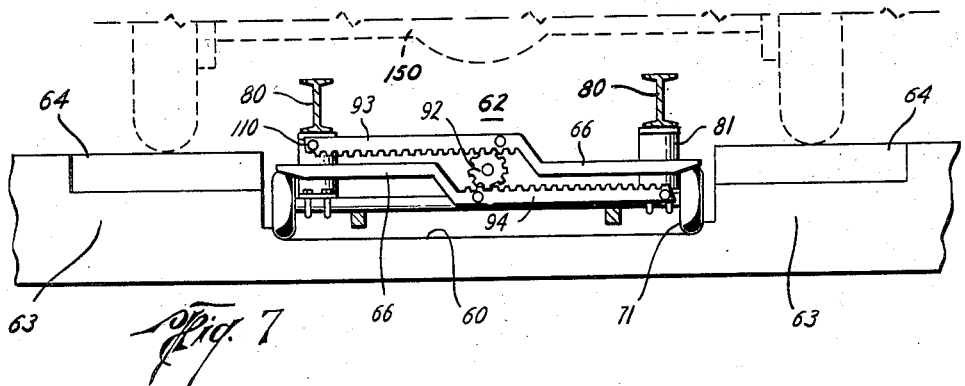
Figure 8:
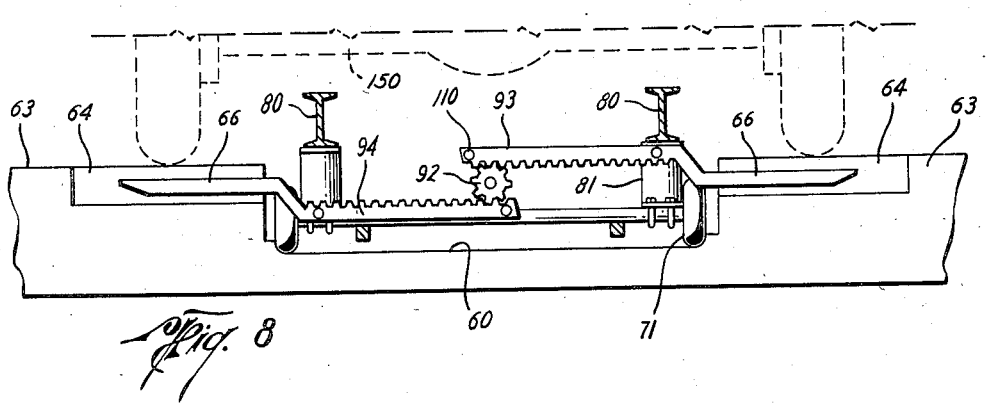
Figure 9:
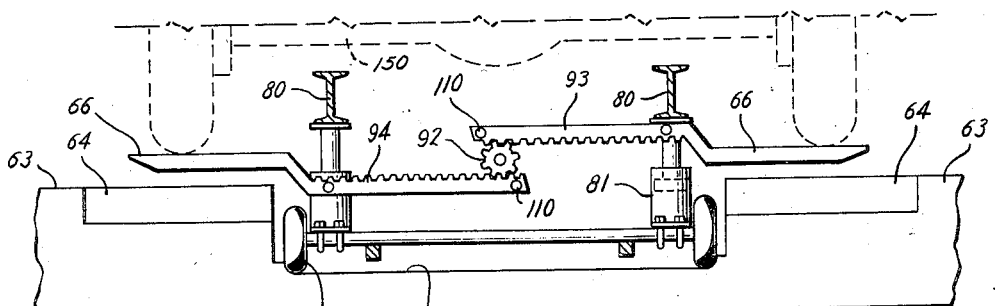
Figure 12:
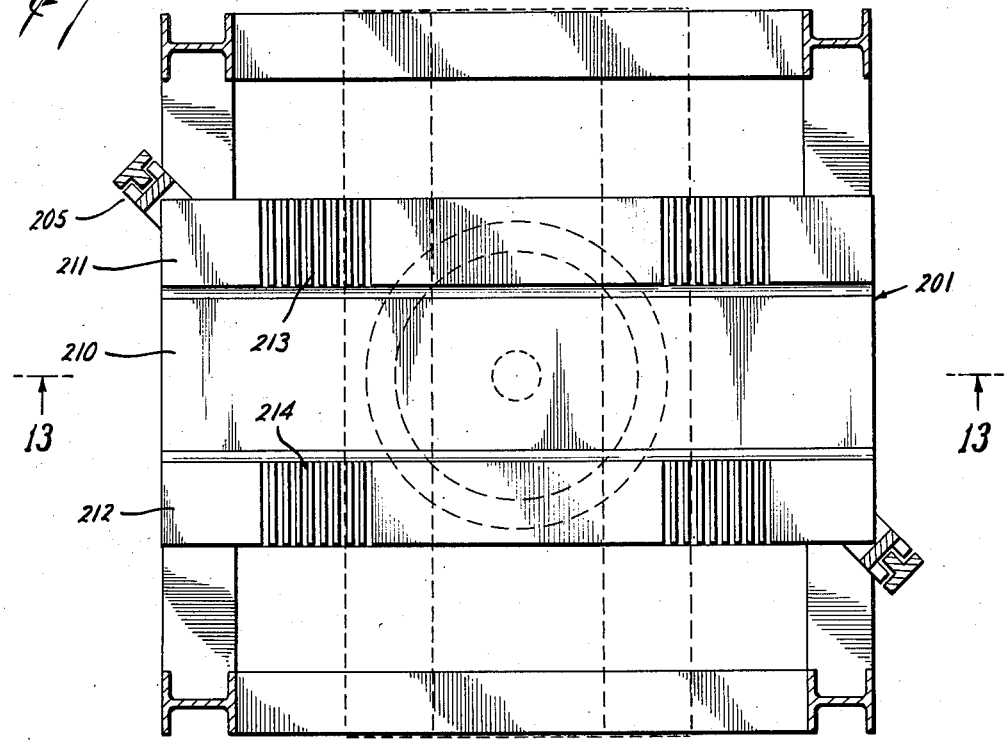
Figure 13:
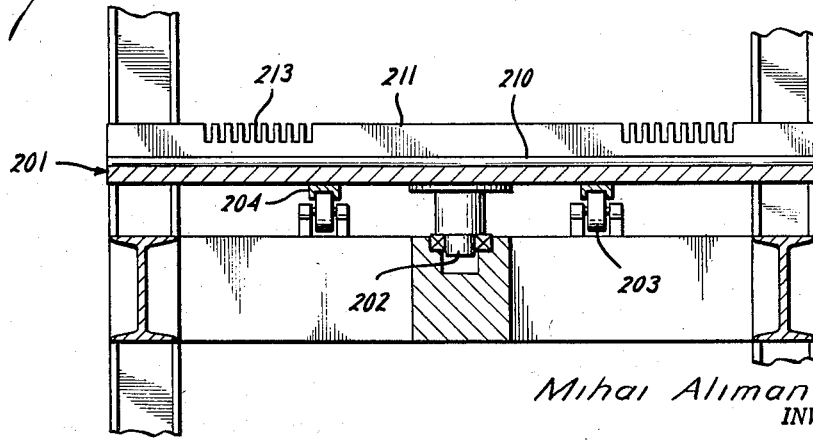

Figs. 7, 8, and 9 are end views of the conveyor showing three different positions in the operation thereof;

Figs. 10 and 11 are schematic side and plan views of a modified form of the apparatus;

Figs. 12 and 13 are plan and side views to a larger scale of a portion of the apparatus shown in Fig. 11;

Fig. 14 is a plan view of another form of conveyor;

Fig. 15 is a side view thereof;

Fig. 16 is a transverse sectional view taken on the line 16—16 of Fig. 15;

Fig. 17 is a transverse sectional view taken on the line 17—17 of Fig. 15.

Figures 1, 2:
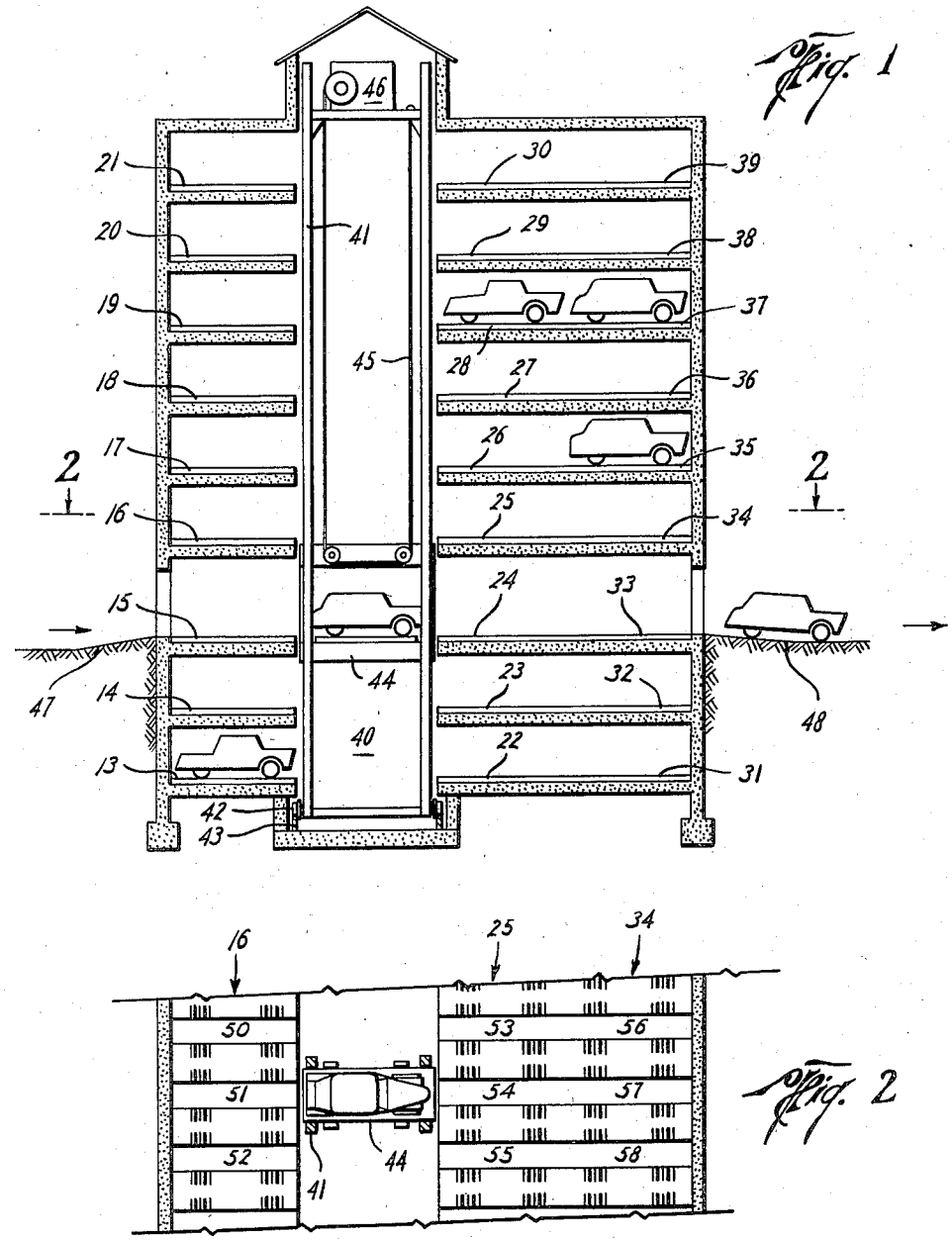
Fig. 1 is a schematic vertical section through an apparatus according to the invention.
Fig. 2 is a schematic horizontal section through the apparatus of Fig. 1 taken on lines 2—2 thereof.

Referring now to Fig. 1 there is shown a garage comprising a plurality of superimposed tiers or horizontal rows of automobile storage shelves 13—21, 22—30, 31—39. The space above each storage shelf and below the shelf or roof above provides a stall for storage of an automobile or other vehicle. The stalls provided by rows of shelves 13—21 form a single stall block and the stalls provided by shelves 22—30, 31—39 form a double stall block. The blocks are at opposite sides of an alley 40 in which is disposed a tower 41 adapted to move horizontally in alley 40 on wheels 42 moving on track 43, and carrying a vertically movable elevator 44 raised and lowered by suitable means such as cable 45 and electric motor 46.

As shown, there are two rows of shelves at each level at the exit side of the alley and one row of shelves at each level at the entrance side, but more or less rows can be placed at either side. One or more of the shelves in rows 15 and 33 are connected to driveways 47, 48 for entrance and exit respectively, leading to street or ground level. If desired, the entrance and exit driveways can be at different levels.

Referring now to Fig. 2, there is shown a plan of the garage at the level of shelf rows 16, 25, and 34. The superimposed shelves in the several rows form vertical columns or towers of shelves indicated at 50—58.

Referring now to Fig. 3, each shelf has a depressed central portion 60 and the elevator has a depressed central portion 61 in which depressed portions a conveyor 62 carried by the elevator, is adapted to travel. The portions 63 of each shelf at the sides of central portion 60 are elevated in respect to portion 60 and are provided with transversely extending channels 64. The portions 65 at the sides of depressed central portion 61 of the elevator are likewise elevated and are provided with channels 64a, similar to channels 64.

Fingers 66 are disposed transversely on conveyor 60 are adapted to be projected outwardly and retracted, as well as being raised and lowered relative to channels 64, 64a, whereby to transfer a load supported by said fingers between the conveyor and a shelf or the conveyor and elevator. The conveyor is provided with wheels 67 which are guided by shoulders 69a, 69b formed at the juncture of the depressed central portions and the elevated side portions of the shelves and elevator as shown more clearly in Figs. 7-9.

Fig. 4 shows elevator 44 in tower 41 with the conveyor 62 on the elevator. An automobile 68 is shown parked on a shelf aligned with the elevator and an automobile 69 is shown parked on the shelf above. In each case, the wheels of the automobiles rest on the channels 64 of elevated portions 63.

Referring now to Figs. 5 and 6, there is shown the details of conveyor 62. A lower chassis or frame 70 is supported on wheels 71 mounted on shaft 72 which is rotated through a belt or chain drive 73 driven by electric motor 74. An upper chassis or frame 80 is supported at an adjustable height above frame 70 by jacks 81 which may be hydraulic, mechanical or other suitable type. Hydraulic jacks are illustrated as connected by suitable piping to a pump 82 driven by electric motor 83.

The upper chassis 80 carries beneath it an electric motor 90 driving shaft 91 on which pinions 92 are secured, said pinions meshing with upper and lower pairs of racks 93, 94, 95, 96 which extend transversely from the ends of longitudinally disposed beams 97, 98 respectively. Fingers 66, previously referred to, extend transversely from beams 97, 98. The fingers are spaced so as to enter channels 64 and may be projected or retracted upon the operation of motor 90. The beams 97, 98 are supported for reciprocatory movement by rollers 110 rotatably mounted on transverse extensions 111, 112 extending from beam 97. The rollers move in transversely disposed channel members 115 supported by upper frame 80.

The power for the several electric motors on the conveyor 62 is supplied from cable 130 wound on an automatic reel 131 of any suitable type.

As best shown in Figs. 7–9, the fingers 66 and the racks driving them are at different levels, rack 93 being above the fingers extending therefrom and the rack 94 being below the fingers extending therefrom, whereby pinion 92 meshing with said racks drives them simultaneously.

Fig. 7 shows fingers 66 retracted, the upper frame 80 lowered, and the conveyor 62 run under an automobile 150 whose wheels rest on the elevated side portions 63 of a shelf, more particularly the channels 64 thereof.

Fig. 8 shows the projection of fingers 66 into channels 64 beneath the wheels of the automobile. Fig. 9 shows the jacks 81 raised to elevate frame 80 and fingers 66 to raise the automobile off the shelf and transfer the load to the conveyor. A similar sequence is used to lift an automobile off the elevator; a reverse sequence replaces the automobile on the shelf or on the elevator.

To insure that the conveyor travels the proper distance out onto the shelf and back to the elevator, and that said conveyor is properly positioned so that its fingers 66 can enter channels 64, 64a, suitable limit switches, not shown, are provided on each shelf and elevator. The electric circuits needed to control the movements of the conveyor, like those of the elevator, do not form part of the present invention and may be of any suitable type.

Preferably, channels 64 and fingers 65 are arranged in groups, one set at each side for the front wheels and one set on each side for the rear wheels, as shown in Figs. 2–5. If desired, the elevator can be provided with side portions elevated only to the same height as the bottoms of the channels in the sides of the shelves, in which case the load would always be on the fingers when a vehicle was being transported from shelf to shelf; however, the arrangement shown is preferred.

In operation, an automobile is driven onto a shelf from the entrance driveway, the conveyor 62 is driven out from the elevator to a position under the automobile to pick it up and take it back to the elevator which is then moved to a desired level by means of the cable 45 and motor 46 and to a desired vertical plane by means of the moving tower 41, and the conveyor is operated to deposit the automobile at the desired shelf. The reverse procedure is used to bring the vehicle back to a shelf at the driveway level from which the vehicle can be driven out of the garage.

Where it is desired to have entrance and exit from the same end of the garage, the arrangement of Figs. 10–13 is suitable. As shown in Fig. 10, an automobile both enters and leaves via driveway 200. As shown in Fig. 11, there is a turntable 201 mounted on the elevator.

Figs. 12 and 13 show the details of the turntable which includes a central pivot 202 and a plurality of rollers 203 mounted on the floor of the elevator and moving in a track 204 under table 201. Detents 205 are used to lock the table in position after it has turned around.

The upper surface of turntable 201 is formed like a shelf, in a manner similar to that described in connection with elevator 44, including a central depressed portion 210 in which moves a conveyor similar to conveyor 62, and elevated side portions 211, 212, each provided with front and rear sets of channels 213, 214.

In operation, an automobile is driven from driveway 200 onto a shelf at the end thereof, the elevator is moved horizontally and/or vertically until opposite the shelf on which the automobile rests, the conveyor, not shown in Figs. 11–13, takes the automobile onto the turntable 201, the turntable is turned around, the elevator is moved vertically and/or horizontally until opposite the shelf selected. The conveyor then takes the vehicle to the desired shelf and returns for another load. The reverse procedure is used for removing the vehicle except that the turntable need not be operated since the vehicle is already headed the right way. If desired, the vehicles can be turned around just before leaving, instead of just before parking the same.

In the conveyor 62 shown in Figs. 7–9, the fingers 66 have an effective length somewhat less than half the width of the conveyor as measured between wheels 71 thereof. The limited longitudinal extent of fingers 66 makes it necessary to increase the width of the conveyor in order to provide in the projected position of the fingers, the proper tread spacing for assuming the load of the vehicle.

However, the width of the conveyors may be substantially reduced when using the arrangement of fingers shown in Figs. 14–17. Thus, the conveyor 300 includes a lower chassis 301 made up of longitudinally extending, parallel beams 302 which may be of I section, and interconnected at their opposite ends by cross members 303 suitably welded thereto. Shaft bearing members 304 are suitably secured to the upper surfaces of beams 302 at the opposite ends thereof; shafts 305 being journalled in transversely aligned pairs of bearing members 304 and wheels 306 being mounted on the outer ends of said shafts.

An upper chassis 307 is mounted on lower chassis 301 for raised or lowered movement relative thereto, by jacks or other suitable means, as previously described in connection with conveyor 62. Upper chassis 307 comprises two pairs of laterally spaced, longitudinally extending channel members 308 interconnected at their opposite ends by cross members 309. The transverse spacing between the pairs of members 308 is such that the same may be disposed outwardly of members 302 of the lower chassis 301, as shown in Fig. 16.

Also extending transversely of chassis members 308 and fixed to the upper surfaces thereof, are pairs of opposed guide members 310; said guide members being located at opposite ends of members 308 and inwardly of cross members 309. Each guide member 310 comprises an upstanding web portion 311 formed with a pair of vertically spaced slots 312 forming upper and lower track means in facing relation on each pair of guide members. Each guide member 310 also includes a horizonal footing portion 313 at the opposite ends thereof for securement to chassis members 308; the bottom edge 314 of the members 310 being spaced above the upper surface of chassis members 308.

On the outer face of the web portion 311 of each guide member 310 and on one end thereof there is journalled a pair of coaxial sprocket wheels 315, 316; and the other end thereof a single sprocket wheel 317 aligned with wheel 315 and connected thereto by a sprocket chain 318. An elongated drive shaft 319 running the length of chassis 307, is journalled for rotation on aligned, upper corner portions of webs 311 of members 310. Small sprocket wheels 320 are fixed to shaft in alignment with sprocket wheels 316 and connected thereto by sprocket chains 321.

Between each pair of guide members 310 there is provided a pair of load bearing and transferring finger assemblies 322, 323. Assembly 322 comprises a pair of longitudinally extending parallel channel members 324 which are interconnected at their opposite ends by vertically disposed end plates 325 welded in place. A set of transversely extending, parallel fingers 326 are welded at one end thereof to the undersurface of members 324, said fingers being of a length substantially equal to the width of the upper chassis 307.

Similarly, assembly 323 comprises parallel members 324a interconnected at their ends by plates 325a; a set of transverse, parallel fingers 326a being welded at one end thereof to the upper surface of members 324a. As shown in Figs. 14, 15, fingers 326, 326a alternate in spaced relation and present upper surfaces located in a common horizontal plane.

Finger assemblies 322, 323 are arranged for guided movement in members 310. To this end, plates 325 on assemblies 322 are provided with a pair of horizontally spaced, outwardly projecting rollers 327 and plates 325a are similarly provided with pairs of rollers 327a. Rollers 327, 327a are respectively receivable in upper and lower track slots 312. In the fully retracted positions of fingers 326, 326a; members 324, 324a are respectively located on opposite sides of chassis 307 with the free ends of fingers 326, 326a extending respectively to the opposite sides of said chassis.

Means is provided for actuating finger assemblies 322, 323 to provide simultaneous and opposite movement of the fingers thereof, to project or retract the same. To this end an L-shaped member 328 has the outer end of one arm 329 thereof welded to a top surface portion of plate 325 on assembly 322, said arm extending over top edge 314a of adjacent guide member 310. The other arm 330 of member 328 extends downwardly and a cross pin 331 at the lower end thereof is aligned with and suitably attached to the upper run of sprocket chain 318.

Similarly, an L-shaped member 328a is secured to assembly 323 through plate 325 thereof, the arm 329 thereof extending horizontally below edge 314 of guide member 310 and the arm 330a extending upwardly with cross pin 331a at the end thereof aligned with and secured to the lower run of chain 318. As shown in Fig. 16, with assemblies 322, 323 in their fully retracted positions, plate 325 of assembly 322 is at the extreme left hand end of the conveyor and plate 325a of assembly 323 is at the extreme right hand end of said conveyor. Accordingly, member 328 is secured to chain 318 adjacent the left hand sprocket wheel 315 and member 328a is secured to said chain adjacent the right hand sprocket wheel 317.

It will be apparent that upon rotation of drive shaft 319 in one direction by suitable means such as an electric motor, not shown, geared thereto, members 328 will move to the right and members 328a will move to the left, looking at Fig. 16, thereby simultaneously projecting the finger assemblies 322, 323 respectively in opposite directions and on either side of upper chassis 307. Reversed rotation of shaft 319 will result in retracted movement of said finger assemblies. Thus, there is provided means for supporting a vehicle by the front and rear wheels thereof and for transferring the same to and from shelves, as previously described.

It will also be apparent that with the arrangement of the finger assemblies as shown in Figs. 14–17, the effective length of the fingers is substantially extended and the increased path of movement thereof, allows the conveyor chassis 307 to be reduced in width, with a corresponding reduction in the width of the depressed central portions of both shelves and elevator in which the conveyor operates. The conveyor 300 is operated in a manner similar to that of conveyor 62 in respect to its movement between shelves and elevator. However, with increased length of the fingers in conveyor 300, vehicles do not have to be accurately centered on the shelves, inasmuch as the fingers in their projected position are adapted to receive the wheels of a poorly centered vehicle.

With the embodiments of the invention described herein, a plurality of street level shelves can be used for reception and delivery of vehicles as desired. Also, several pairs of stall blocks can be disposed side-by-side, in which case, if more than two pairs are used, it will be necessary to drive through one pair of stall blocks to reach the next, which can conveniently be done by providing through driveways at intervals in places where they will not block the travel of the elevator towers along the alleys, at the ends of the blocks for example, or vehicles can be driven through one block to the next over the elevator in the first block.

This application is a continuation in part of copending application Ser. No. 458,491, filed September 27, 1954, now abandoned.

While preferred embodiments of the invention have been shown and described, many modifications thereof can be made by one skilled in the art without departing from the spirit of the invention and it is intended to cover by Letters Patent all forms of the invention falling within the scope of the following claims.

Having thus disclosed my invention, I claim as new and desire to protect by Letters Patent:

1. A conveyor for transferring vehicles from one location to another comprising a lower chassis, wheels on said lower chassis, an upper chassis, means for mounting the upper chassis on the lower chassis for raised and lowered movement of the upper chassis relative to the lower chassis, load carrying means on said upper chassis comprising a pair of sets of spaced fingers disposed in a common horizontal plane, and means for interconnecting the inner ends of the respective sets of fingers, the interconnecting means of said sets of fingers being respectively located above and below said common horizontal plane, one set of said fingers being arranged for projected and retracted movement from one side of said upper chassis, the other set of fingers being arranged for projected and retracted movement from the other side of said upper chassis, means for simultaneously moving said sets of fingers for projection or retraction thereof, and interengageable means on each of said sets of fingers and said upper chassis for supporting said sets of fingers in said common horizontal plane throughout the projected or retracted movement thereof, the interengageable means associated with said sets of fingers being vertically displaced relative to each other and on opposite sides of said common horizontal plane.

2. A conveyor as in claim 1 wherein said last mentioned means comprises transversely extending track means on said upper chassis for each set of fingers, and roller means on each set of fingers moving on adjacent track means.

3. A conveyor as in claim 2 wherein said track means comprises a pair of channeled members with their open portions in opposed relation to each other.

4. A conveyor as in claim 1 wherein said finger moving means comprises rack members on each set of fingers with the rack members on one set of fingers extending in a direction opposite to that of the rack members on the other set of fingers, the rack members of the respective sets of fingers being located in vertically spaced relation with their teeth facing each other, and pinions interengaging the facing teeth of said rack members for actuating the rack members and correlating the simultaneous and opposite projected and retracted movement of said rack members and their associated fingers.

5. A conveyor as in claim 1 wherein said finger moving means comprises an endless chain arranged with upper and lower parallel runs thereof having movement in a path parallel to the movement of said sets of fingers, means for connecting said sets of fingers respectively with the upper and lower runs of said chain at points adjacent opposite ends thereof respectively, and means for imparting movement to said chain.

6. A conveyor for transferring vehicles from one location to another comprising a lower chassis, wheels on said lower chassis, an upper chassis, means for mounting the upper chassis on the lower chassis for raised and lowered movement of the upper chassis relative to the lower chassis, load carrying means on said upper chassis comprising a pair of sets of spaced fingers extending transversely of the chassis, each set of fingers being interconnected at the inner ends thereof by a member extending longitudinally of said chassis, the free ends of said sets of fingers extending respectively to the opposite sides of said chassis, each set of fingers having roller means axially mounted at the opposite ends thereof, transversely extending guide members for each set of fingers on said upper chassis having vertically displaced track means for respectively receiving the roller means associated with said sets of fingers, and transmission means for simultaneously moving sets of fingers in opposite directions for projected or retracted movement thereof, said sets of fingers having upper surfaces disposed in a common horizontal plane, said guide members and roller means respectively associated with said sets of fingers being located in horizontal planes above and below said common horizontal plane and operative to maintain said sets of fingers in said common plane during the projected or retracted movement thereof.

7. A conveyor as in claim 6 wherein said transmission means comprises rack members extending from said finger interconnecting member on each set of fingers at the opposite ends thereof and parallel thereto, the rack members on one set of fingers being in opposed and vertically spaced relation to the rack members on the other set of fingers and extending in opposite directions thereto, and pinion means engaging opposed rack members for actuating the same for simultaneous and opposite projected or retracted movement thereof and the associated sets of fingers.

8. A conveyor as in claim 6 wherein said transmission means comprises a pair of spaced sprocket wheels rotatably mounted on one of said guide members, an endless chain engaging said sprocket wheels with upper and lower runs extending parallel to said fingers, means interconnecting the inner end of each set of fingers respectively with the upper and lower runs of said chain adjacent said sprocket wheels respectively with said sets of fingers in fully retracted position, and means for rotating said sprocket wheels in directions to respectively project or retract said sets of fingers.

9. In apparatus for storing vehicles from an elevator to a storage stall, an elevator having a central depressed guideway and a raised lateral supporting portion on each side of said depressed guideway, said supporting portions adapted to support an automobile, a conveyor including a lower chassis guided to move in an exact rectilinear path in said guideway, and an upper chassis mounted for upward and downward movement on said lower chassis, beams extending longitudinally of said conveyor and suspended from said upper chassis for movement laterally thereof, said beams carrying sets of fingers projecting laterally from the sides of said upper chassis, said sets of fingers being disposed in positions corresponding to the position of the wheels of an automobile supported thereover on said laterally raised supporting portions, there being channels formed in said supporting portions into which said fingers may be projected and from which they may be withdrawn so as to free the conveyor to move freely under the automobile, power means for raising and lowering the upper chassis so as to raise the fingers to support the wheels of the automobile thereon off the stationary supporting portions for movement by the conveyor off the elevator, and to lower the fingers so as to release the automobile onto the supporting portions, power transmission means for simultaneously moving all of the fingers out of the channels so as to free the conveyor for movement off the elevator when said fingers have so released the automobile from support thereon, said transmission including rack members extending from said beams laterally in opposite directions from each other, and in directions opposite from their corresponding fingers with the teeth of each set of racks facing one another, pinions disposed between the opposing teeth to interengage the same for actuating the racks and correlating the simultaneous and opposite inward and outward movement of the racks and their associated fingers into and out of their corresponding channels.

10. Apparatus for storing vehicles from an elevator to a storage stall as defined in claim 9, including a stall having a central depressed guideway and a raised lateral support on each side thereof corresponding to the guideway and supporting portions on the elevator, said lateral supports being formed with channels to fit the retractable fingers carried by the upper chassis of the conveyor when the latter is moved into the stall into position of registry of said fingers above said channels, so that the upper chassis may be lowered to free the fingers from the wheels of the automobile and then to retract the fingers out of the channels to free the conveyor for movement out of the stall.

11. In apparatus for storing vehicles from an elevator to a storage stall, an elevator having a central depressed guideway and a raised lateral supporting portion on each side of said depressed guideway, said supporting portions adapted to support an automobile, a conveyor including a lower chassis guided to move in an exact rectilinear path in said guideway, and an upper chassis mounted for upward and downward movement on said lower chassis, beams extending longitudinally of said conveyor and suspended from said upper chassis for movement laterally thereof, said beams carrying sets of fingers projecting laterally from the sides of said upper chassis, and sets of fingers being disposed in positions corresponding to the position of the wheels of an automobile supported thereover said laterally raised supporting portions, there being channels formed in said supporting portions into which said fingers may be projected and from which they may be withdrawn so as to free the conveyor to move freely under the automobile, power means for raising and lowering the upper chassis so as to raise the fingers to support the wheels of the automobile thereon off the stationary supporting portions for movement by the conveyor off the elevator, and to lower the fingers so as to release the automobile onto the supporting portions, power transmission means for simultaneously moving all of the fingers out of the channels so as to free the conveyor for movement off the elevator when said fingers have so released the automobile from support thereon, said transmission means including elongated members extending from said beams laterally in opposite directions from each other, and in directions opposite from their corresponding fingers, one elongate member being in vertically and upwardly offset relation to the set of fingers carried by the beam with which said one member is connected, the other elongated member being in vertically and downwardly offset relation to the set of fingers carried by the beam with which the other member is connected, said sets of fingers being in a common horizontal plane, the outer end of each of said elongated members being in a position located inwardly of the position of the outer ends of the set of fingers carried by the beam connected to the other elongated member in the retracted position of said sets of fingers, said one elongated member extending for substantial or major length of the set of fingers carried by the beam connected to the other elongated member in the retracted position of said sets of fingers, and means interengaging said elongated members for actuating the same and correlating the simultaneous and opposite inward and outward movement of said elongated members and their respective sets of fingers into and out of their corresponding channels.

12. A conveyor for transferring vehicles from one location to another comprising a lower chassis, wheels on said lower chassis, an upper chassis, means for mounting said upper chassis on said lower chassis for raised and lowered movement relative thereto, load carrying and transfer means on said upper chassis comprising a pair of upstanding, transversely extending guide members mounted on said upper chassis in parallel relation, said guide members being formed with parallel, vertically spaced transverse track slots, the slots in one guide member facing and in alignment with respectively the slots in the other guide member, a pair of finger assemblies arranged for movement respectively in said upper and lower guide slots, each assembly comprising beam means extending longitudinally of said conveyor and a set of parallel fingers secured at one end thereof to said beam means, one set of fingers being secured to the underside of one beam means and the other set of fingers being secured to the upper surface of the other beam means, the fingers of one set alternating with the fingers of the other set and the upper surfaces of all fingers being disposed in a common horizontal plane, one of said beam means being disposed on one side of said upper chassis and the other beam means being disposed on the other side of said upper chassis to locate the respective fingers in retracted positions, and means on said upper chassis engageable with said pair of finger assemblies for actuating the same and correlating the simultaneous and opposite inward and outward movement of said finger assemblies.

13. A conveyor as in claim 12 and including a pair of horizontally spaced rollers rotatably mounted on each end of each of said beam means, said pairs of rollers being respectively aligned with and received in the adjacent track slots of said guide members, and said last mentioned means comprising a pair of horizontally spaced sprocket wheels rotatably mounted on said guide members, an endless sprocket chain connecting said sprocket wheels, means connecting the finger assembly associated with rollers received in the upper track slot with an upper run portion of said chain, connector means connecting the finger assembly associated with rollers received in the lower track slot with a lower run portion of said chain, said connector means being respectively located adjacent said sprocket wheels in the retracted position of said finger assemblies, and means for rotating said sprocket wheels.

14. A conveyor for transferring vehicles from one location to another location comprising a lower chassis, wheels on said lower chassis, an upper chassis, means for mounting said upper chassis on said lower chassis for raised and lowered movement relative thereto, load carrying and transfer means on said upper chassis comprising a pair of longitudinally disposed beam means, a set of parallel fingers having a length substantially equal to the width of said upper chassis connected at one end thereof to each of said beam means, the free ends of said fingers extending to the opposite sides respectively of said upper chassis said beam means being located in vertically spaced planes and the fingers secured thereto being located in a common horizontal plane between said vertically spaced planes, means on said upper chassis for guiding the movement of each of said beams in horizontal paths transversely of said upper chassis together with the fingers respectively associated therewith whereby one beam means is adapted to move from one side of said upper chassis to the other side thereof to project the fingers thereon from the other side of said upper chassis for the major portion of the length thereof, and the other beam means is adapted to move from the other side of said upper chassis to the one side thereof to project the fingers thereon from the one side of said upper chassis for the major portion of the length thereof, and means engageable with said beam means for actuating the same and correlating the simultaneous and opposite inward and outward movement of said beam means and the fingers associated therewith.

References Cited in the file of this patent

UNITED STATES PATENTS

| | | |
|---|---|---|
| 493,542 | Bessing et al. | Mar. 14, 1893 |
| 1,584,080 | Dinkelberg | May 11, 1926 |
| 1,584,517 | Dinkelberg | May 11, 1926 |
| 1,641,651 | Wulf | Sept. 6, 1927 |
| 2,016,662 | Aitken | Oct. 8, 1935 |
| 2,663,443 | Schenkelberger | Dec. 22, 1953 |
| 2,801,011 | Overlach et al. | July 30, 1957 |

FOREIGN PATENTS

| | | |
|---|---|---|
| 337,726 | Great Britain | Oct. 28, 1930 |
| 728,493 | Germany | Nov. 27, 1942 |